United States Patent Office 3,234,277
Patented Feb. 8, 1966

3,234,277
METHOD OF MAKING DIAMINO ALKALI METAL COMPOUNDS AND LITHIUM ACETYLIDE COMPOUNDS
Oscar Francis Beumel, Jr., West Chester, and Robert Francis Harris, Linwood, Pa., assignors to Foote Mineral Company, Exton, Pa., a corporation of Pennsylvania
No Drawing. Filed Sept. 25, 1962, Ser. No. 226,142
12 Claims. (Cl. 260—533)

This application is a continuation-in-part of application Serial Number 216,037, filed August 10, 1962, now abandoned. This invention relates to novel organo alkali metal compounds and to various methods for making these compounds. More particularly, this invention provides novel methods of making organolithium compounds and organosodium compounds which have improved economic advantages.

It is known that organometallic compounds such as mono- and dilithium acetylide can be prepared in a liquid ammonia solution and that dilithium acetylide and sodium acetylide can be prepared by the reaction of molten or near molten lithium and sodium with acetylene. Such processes using either liquid ammonia solutions or molten alkali metals are subject to a number of shortcomings, particularly if they are to be carried out on a commercial or semi-commercial scale. Moreover, the organometallic salt lithium acetylide (i.e. monolithium acetylide) is extremely unstable and must be maintained in liquid ammonia which, of course, requires low temperatures and the like. Due to its instability, the storing and shipping of monolithium acetylide is unwieldy and commercially unattractive.

It is an object of this invention to provide an improved method for the preparation of organo alkali metal compounds, wherein the use of liquid ammonia or molten alkali metals is avoided.

A further object of the invention is to provide novel organolithium compounds which are stable at room temperature and which can be shipped and stored without extensive precautions.

A still further object of the invention is to provide novel alkali metal amine salts.

Another object of the invention is to provide a novel process for producing lithium salts of various amines.

A primary object of the invention is to provide a process for making stable organolithium complexes.

Another object of the invention is to provide a process for making dilithium organo compounds.

These and other objects of the invention will become evident from a consideration of the following specification and claims.

It has been found that finely divided metal dispersions of alkali metals such as sodium and lithium, can be reacted with certain organo compounds to produce the corresponding organo alkali metal salt, provided the reaction is conducted in the presence of certain amine compounds. It has been discovered that certain sodium, monolithium and dilithium compounds can be produced according to the invention when catalytic quantities of the amine compound are employed. When monolithium complexes are desired, equivalent amounts of certain amine compounds are used, with the complexing agent being the amine compound.

The general type of reactions believed to occur during applicants' process can be represented by the following:

(a) When an alkali metal salt of the amine is produced:

(I) 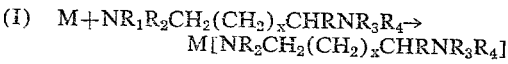

In the above equation, hereafter referred to as reaction I, M represents sodium or lithium metal and $R_1$, $R_2$, $R_3$ and $R_4$ can each be a hydrogen atom, an alkyl radical having from one to 10 carbon atoms or an alkylamine radical having from one to 10 carbon atoms. R can be hydrogen or an organo radical having from one to 10 carbon atoms. The symbol $x$ is a whole number from 0 to one. It has been discovered that suitable amine compounds are 1,2- or 1,3-substituted amines, that is where two amino groups are on adjacent carbon atoms or on carbon atoms separated from each other by not more than one carbon atom. When $x$ is 0, a 1,2-substituted amine is defined and when $x$ is 1, a 1,3-substituted amine is defined. It has been found that at least one acid amino hydrogen atom must be present, that is at least one of the substituents on one of the 1,2 or 1,3 amine nitrogen atoms as defined above must be hydrogen. Thus, of the two 1,2 or 1,3-amino groups, at least one must be a primary or a secondary amino group, and therefore in the above formula at least one of the substituents $R_1$, $R_2$, $R_3$ and $R_4$ must be hydrogen. In the foregoing equation and throughout the specification for purposes of illustration only, the substituent $R_1$ is selected to represent the acid hydrogen atom which reacts to form the intermediate alkali metal salt, however it is understood that any of the substituents could react similarly to form said salt. The N-alkali amine salt is an essential intermediate of the invention. It will be understood by those skilled in the art that various derivatives of the above defined N-alkaliamine salt can be produced according to reaction I. For example, di-alkali metal amine salts such as N,N'-dilithio-1,3-diaminopropane and N,N'-dilithioethylenediamine can be obtained.

The N-lithio amine salts produced according to reaction I are stable compounds and can be isolated and stored for use at a later time, e.g. for reaction with an organo compound such as acetylene. The N-sodio amines, on the other hand, are difficult to isolate as a separate intermediate phase, and it is preferred, when producing the final organosodium product, that the intermediate amine sodium mixture be reacted directly with the organo compound without isolation of the intermediate products. Moreover, isolation of the intermediate organosodium compound is generally not required since, as is explained below, only catalytic amounts of the corresponding amine need be employed in the reaction.

Additional sources of the alkali metal reactant other than the elemental metals themselves can be employed in reaction I, if desired. For example, lithium nitride i.e. $Li_3N$ can be used as a source of lithium, forming three moles of the corresponding n-lithio salt. Lithium and sodium hydrides can also be used.

(b) When the mono alkali metal organo salt is produced from the intermediate:

(II) 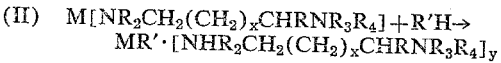

In the above equation, hereafter referred to as reaction II, M, $R_2$, R, $R_3$, $R_4$ and $x$ are as defined in reaction I, R'H is an organo compound having a hydrogen atom, H, which is more acidic than the most acidic hydrogen atom on the amine compound, and $y$ is a whole number from 0 to 1.

It will be observed that reaction II envisions two types of products. When $y$ is 0, a metal salt MR' is formed and when $y$ is 1, an amine complex results. When the alkali metal is sodium, the organo salt is stable and the complex as such is unstable. Hence in the above reaction when M is sodium, $y$ is 0.

When the alkali metal is lithium, certain of the organo salts, such as $LiC\equiv CH$, are unstable. Others, such as lithium phenylacetylide are stable. However, in all cases the lithium complex is the product of reaction II since equivalent amounts of the amine are present. Thus, when M in reaction II is lithium, y is 1. It will be understood that the above described organo-lithium complexes could be obtained in polymeric form, such as dimers, trimers and the like. For the purposes of discussion these compounds will be described as monomers.

(c) when a dialkali metal compound is produced:

(III) $2Li + NR_1R_2CH_2(CH_2)_xCHRNR_3R_4 + CH\equiv CH$
$\rightarrow LiC\equiv CLi + NR_1R_2CH_2(CH_2)_xCHRNR_3R_4$ The dilithium acetylide produced in the above reaction, referred to hereafter as reaction III, unlike the monolithium acetylide, is stable and is not tied up in a complex with the amine. Hence it is apparent that only catalytic amounts of the amine need be used to produce a dilithium compound such as dilithium acetylide since the amine is regenerated and available for further reaction. It is understood that the alkali metal salt described under reaction I is a necessary intermediate in the present reaction. Moreover, other organic compounds having two acidic hydrogen atoms can be substituted for acetylene in the foregoing equation.

The general process of applicants' invention can be summarized as follows:

(IV) $M + NR_1R_2CH_2(CH_2)_xCHRNR_3R_4$
$\rightarrow M[NR_2CH_2(CH_2)_xCHRNR_3R_4M[NR_2CH_2(CH_2)_x$
$CHRNR_3R_4] + R'H \rightarrow MR'(M)_z \cdot [NHR_2CH_2(CH_2)_x$
$CHRNR_3R_4]_y$ In the foregoing, referred to as general reaction IV, M can be lithium or sodium, the amount of the amine compound can range from catalytic to equivalent or even greater amounts, x, y and z are whole numbers from 0 to 1 with the sum of x, y and z being not greater than 2, and M, $R_1$, $R_2$, $R_3$, $R_4$, R and R' are as defined above.

In connection with general reaction IV the following observations are pertinent:

(a) When M is sodium, as noted above, the intermediate N-sodio salt, $Na[NR_2CH_2(CH_2)_xCHRNR_3R_4]$, is rarely isolated. The complex $NaR'[NHR_2CH_2(CH_2)_xCHRNR_3R_4]_y$ is unstable, if it is formed, and the product will be the organo salt NaR', whether stoichiometric or catalytic amounts of amine compound are used.

(b) When M is lithium, the organo salt may or may not be stable depending on the organo compound. If a stable organo salt can be formed, the amount of amine used may be either catalytic amounts or the stoichiometric amount. In the case where stoichiometric amounts of amine are used, a complex will be formed. If less than a stoichiometric amount is used (down to a catalytic amount), a mixture comprising the organo salt and the corresponding complex will be produced, with the amount of each present depending on the amount of amine used. When a purely catalytic amount of amine is used the organo salt will be substantialy the sole product.

(c) If an unstable organo compound such as lithium acetylide is obtained stoichiometric amounts of an amine are necessary if all of the compound present is to be converted to the corresponding stable lithium acetylide·amine complex. If less than stoichiometric amounts are employed corresponding proportions of the stable complex and decomposition products of the unstable product will be obtained.

These observations can be applied to general reaction IV through the following provisos:

(a) when y equals 1, M is lithium, the amine compound is present in equivalent amounts and z equals 0;

(b) when z equals 1, the amine compound need be present in only catalytic amounts, and y equals 0;

(c) when M is sodium, only catalytic amounts of the amine need to be present and y is 0.

That the herein described monolithium organo compounds can be produced by the instant process without resorting to either molten lithium metal or liquid ammonia is quite unexpected, for it has been found that lithium metal dispersions in an inert solvent do not react directly with acetylene at temperatures ranging from room temperature up to about 160° C. under atmospheric pressure. Above 160° C. lithium reacts directly with acetylene to form dilithium acetylide, whereas unexpectedly, the N-lithio salt of an amine reacts with acetylene at temperatures ranging from the solvent freezing temperature up to about 45° C. to produce the corresponding monolithium acetylide complex of the amine.

Although it is known that sodium will react with certain organo compounds such as acetylene directly in an inert solvent above about 60° C., this reaction is slow and unattractive at temperatures below about 90° C. Therefore, the direct reaction between sodium and acetylene in the presence of an amine compound at room temperature or below to produce the corresponding sodium acetylide in high yields at a satisfactory rate is unexpected and unobvious.

When producing certain lithium salts such as monolithium acetylide·amine and dilithium acetylide according to the instant invention, it has been discovered that these compounds can be produced in relatively high yields and in a high degree of purity by controlling the amount of amine introduced into the reaction mixture and by controlling the temperature of the reaction, thereby avoiding the formation of mixtures of mono- and dilithium compounds. That is, employing catalytic amounts of the amine compound and elevated temperatures yields dilithium acetylide, while employing equivalent amounts of the amine compound and temperatures below about 45° C. results in the formation of monolithium acetylide·amine complexes.

A further advantage of the instant invention is that certain monolithium salts which heretofore were unstable at room temperature can now be produced in a crystalline or slurry form which is stable at room temperature and which is readily susceptible to storage and/or shopping. Moreover, the corresponding intermediate product, that is, the N-lithio salt of the amine can also be prepared and stored in a stable form.

The instant process is flexible in that it can be adapted to single or multi-phase systems and can be achieved in one or two steps, with or without isolation of intermediate products. A further distinct advantage of the herein claimed process is that it can be used with various sources of alkali metal. Further, isolation of substantially pure organo alkali metal salts and dilithium organo salts is readily accomplished, thus requiring few manipulative procedures which results in the production of these compounds in a high state of purity at relatively low cost. Unexpectedly, certain of the organolithium salts and complexes of the invention are nonpyrophoric and nonexplosive.

An unexpected feature of the invention is that the particle size of the organsodium salts produced according to general reaction IV can be controlled by the concentration of the amine catalyst employed; that is, the particle size of the organosodium salts varies inversely with the concentration of the amine present in the reaction mixture, i.e. large crystals of the salt are achieved by using small concentrations of the amine catalyst. Further with respect to the organosodium salts of the invention it is noted that only catalytic quantities of the amine compound need be employed. The resultant sodium salt product which is free from the complexing agent is achieved in a high state of purity.

It has further been discovered that if it is desired to form a lithium acetylide complex capable of being isolated in dry (solvent free) form care must be exercised in the selection of the amine compound used. It has been found that certain of the above defined amine compounds form more stable complexes with certain organolithium compounds. For example, ethylenediamine and diethylenetriamine produce stable lithium acetylide complexes which can readily be isolated in the stable crystalline, solvent free form whereas, 1,3-diamino hexane, and 1,2-diamino decane tend to form the corresponding lithium acetylide complexes which, although stable in slurry form, are more difficult to obtain in a solvent free state. It is understood however, that the herein described organolithium salts can be complexed with any of the amine compounds described in the above reactions.

The alkali metal employed in the process of this invention should preferably be in a fine state of subdivision since the reactivity of the material is a function of its particle size, that is, the reaction occurs essentially at the surface of the metal, and the finer the division, of course, the more surface will be available for the reaction.

Methods of forming dispersions of these alkali metal compositions in liquid media are well known in the art. Such dispersions can be prepared, for example, by fusing lithium metal or sodium metal in an inert liquid and subjecting the entire mixture to vigorous agitation while maintaining it at a temperature at which the lithium metal is in the molten state. The vigorous agitation can be accomplished by using a high speed agitator such as a turbine agitator operating with sufficient force to subdivide the metal to the desired particle size. This results in a suspension of finely divided particles of the metal. In general it is desirable that all metal particles be below 500 microns in diameter with the average particle diameter being not more than about 100 microns. The average particle size may advantageously be lower, for example of not more than 10 microns and preferably of the order of 3 microns or less. If desired, the dispersion by agitation may be followed by treatment of the dispersion in a suitable mill such as a homogenizer which will still further reduce the particle size and insure an even higher rate of reaction.

If desired, dispersing agents may be employed in preparing the alkali metal dispersions. For example, useful dispersing agents used in the preparation of lithium and sodium metal dispersions are well known in the art. They include, for example, dimerized linoleic acid, oleic acid, aluminum stearate, aluminum laurate, calcium stearate, lead naphthenate and other metallic soaps, lecithin, colloidal carbon, dispersed polymers such as polyethylene, rubbers and the like and many others. Although the use of such agents which are useful for the facilitation of the dispersion of the alkali metal in a liquid medium is not necessary in the practice of the present invention, they may be used if desired. Generally they are added to the mixture of alkali metal or other lithiating agent and liquid medium before agitation to disperse the substance is applied.

The liquid medium for the metal dispersion should be nonreactive towards the metal and, under the pressure conditions obtaining, should have a boiling point above the temperature at which the dispersion is prepared and above the reaction temperature of the process. (However, dispersing liquids having a boiling point below such temperatures may be used provided the operations are carried out under pressure.) High flash hydrocarbon solvents such as mineral oils, for example white oil, or refined diesel fuels are advantageously used because of the low fire hazard they present. However, any of a wide variety of inert organic solvents are useful, particularly those of the hydrocarbon class such as petroleum, pentane, cyclopentane, hexane, cyclohexane, heptane, mineral spirits and other petroleum hydrocarbons of various kinds, aromatics for example such as benzene, toluene, xylene and so forth and mixtures of these materials may be used.

It is further preferred that the liquid dispersing media used be free of impurities which are highly reactive with the alkali metal or with reaction mixture components such as R'H, $NR_1R_2CH_2(CH_2)_xCHRNR_3R_4$, the resulting N- alkali metal amine salt, and the various products of the reaction such as $$MR'(M)_z \cdot [NR_1R_2CH_2(CH_2)_xCHRNR_3R_4]_y$$

Thus, materials such as water, alcohols and olefins should be absent. In selecting the liquid medium it is to be noted that certain of the mentioned liquid reaction media, here characterized as inert, may react with the organo alkali metal salt of the reaction under certain conditions and where this would be disadvantageous, the liquid medium for the metal dispersions should be selected to avoid it.

The source of the alkali metal reactant to be used in any of the reactions described above can be other than the metal itself, for example, propyllithium, butylsodium or lithium nitride can be used. The only limiting feature as to the impurities which can be tolerated in these materials is that the impurity should not react with the end product. If such an impurity would react with the amine compound, although this would be an unfavorable condition, it could be tolerated by the mere addition of more of the amine compound. As a result of the flexibility of the instant process it is contemplated that the most readily available and economically attractive source of lithium or sodium could be employed.

The amine compounds suitable for use in the instant process are described in general reaction I above and have the general formula $NR_1R_2CH_2(CH_2)_xCHRNR_3R_4$ wherein $R_1$, $R_2$, $R$, $R_3$, $R_4$ and $x$ are as defined above. It has been found that amine compounds other than a 1,2- or 1,3-substituted amine are unattractive in the instantly described process. That is, where the amino groups on adjacent carbon atoms or on carbon atoms separated from each other by not more than one carbon atom. Moreover, it has been found that the amine compound should have at least one acid hydrogen present. An amine compound having all the amino hydrogen atoms replaced by alkyl groups, i.e. a tetraalkyl substituted diamine for example, will not form the necessary N-alkali intermediate. Examples of preferred 1,2- and 1,3-substituted amine compounds which can be used in applicants' process are ethylene-diamine, 1,2-diamino propane, 1,3-diamino propane, 1,3-diamino butane, 1,3-diamino hexane, 1,2-diamino decane, diethylenetriamine, triethylenetetramine and the like. Examples of various N-substituted amine compounds which can be used are N,N,N'-trimethylethylenediamine, N,N-dihexylethylenediamine, N-methyl-N'-butyl ethylenediamine, and N-octyl-1,3-diamino propane. As with the other reactants and the solvents employed in this process, it is understood that the amine compounds will be free from any moisture, olefinic compounds or other materials which are reactive with the reactants or the products of the process. As discussed previously, it is necessary to employ equivalent amounts of amine when the resultant organolithium compound is unstable and isolation thereof is a solvent free condition or storage in a stable slurry form is desired.

The organo compound represented by R'H in the above reaction which is reacted with the intermediate alkali metal amine salt should be stable under the conditions of the reaction. A wide range of substances can be used, provided the compound has a hydrogen atom, herein designated H, which is more acidic than the most acidic hydrogen atom of the amine compound employed in the reaction. Examples of organo compounds which form organolithium compounds according to the invention and which have a hydrogen atom more acidic than the hydrogen atom of the amine compounds used in the reaction are acetylene, fluorene, indene, ethyl acetylene, phenyl acetylene, aniline and diphenylamine. The comparative acidity of such organo compounds is discussed and tabulated in an article by W. K. McEwen entitled "Acidity of Compounds Hydrocarbon Activities" published in the J. Am. Chem. Soc., 58, 1124 (1936).

It is essential when producing the N-alkali metal amine salts according to reaction I that the solvent media be stable toward the reactants and products at the temperature of the reaction. Generally the reaction is maintained at reflux during the formation of such salts and therefore the use of various ether solvents such as tetrahydrofuran, Carbitols and the like which tend to be cleaved by the organo alkali compounds at these temperatures should be avoided. However, when a two-step process is used, and the intermediate amine salt is isolated these various oxygenated solvents are suitable in the second step, that is in reaction II where the reaction is conducted at a temperature less than about 45° C.

Aromatic hydrocarbon solvents in which the amines are readily soluble such as benzene are particularly preferred, for in such a system a single liquid phase reaction media results. Although aliphatic solvents such as hexane wherein the amine compound is not readily soluble can be employed, a two-phase liquid system results and, as would be expected, the rate of reaction is somewhat reduced. It should be noted however, that the solubility of amines in certain solvents such as hexane increases with an increase in temperature and therefore at reflux temperatures such amine compounds are readily soluble in these solvents and the rate of reaction is satisfactory. The various solvents discussed above as suitable for use as dispersing media for the alkali metal can also be used as reaction media for reaction I. Moreover, it is further understood that such solvents can be used as the dispersing material and the reaction media in either a single or multi-step process. For example, when the organosodium products are prepared according to the invention, and the isolation of the intermediate sodium amine salt is avoided, a single solvent such as benzene can be effectively employed.

It has also been found that the solvent employed cannot have a hydrogen atom more acidic than the hydrogen atom of the amine compound. However, the amine compounds themselves can be employed as solvents and this embodiment is particularly attractive when equivalent amounts of amine are required, that is the amine can be effectively employed in a dual roll as a reactant or catalyst and as a solvent. Moreover, various other compounds such as thioethers and the like can also be employed as solvents. Whether these solvents can be employed in a one-step process or only in the second step of the process, that is reaction II, will be determined by their stability and freedom from cleavage and the like at reflux temperatures.

As described in Example XVIII, reaction II can be conducted in the absence of a solvent; however, generally a solvent is preferred. It is further essential that the solvent be free from any reactive materials such as water, olefinic compounds and the like and in a preferred embodiment of the invention the solvents are employed in a high state of purity. Under certain conditions it might be preferable to employ a mixture or combination of the above solvents to take advantage of the stability, solubility and catalytic properties of such mixed solvents. Usually the temperature of reaction for reaction III and general reaction IV is below the cleavage temperature of the various oxygenated solvents and therefore a wide range of solvents may be employed.

The alkali metal dispersion, amine reactant and organo compound can be introduced into a reaction vessel simultaneously or in numerous other ways. For example, the amine may be added to the metal dispersion first, with the organo compound subsequently added to the resultant slurry, or the metal dispersion can be added to a reaction vessel containing the amine or a mixture of the amine and an inert solvent with the organo compound being subsequently added, or the metal dispersion and organo compound can both be added simultaneously to the amine. It is generally desirable to have an excess of the organo compound present to insure complete reaction of all the lithium metal in dispersion. It may also be desirable to introduce additional solvent or diluent into the reaction mixture. As discussed previously, the liquid reaction medium for the present invention may be an inert liquid such as those mentioned above in reference to the preparation of the lithium dispersions or alternatively, it can consist primarily of the amine material or a mixture of solvent and the amine. It is noted that the reaction mixture need not be in the same solvent in which the metal is dispersed, although it may be.

The proportions of reactants used may be varied to a considerable extent. Considering just general reaction IV, when substantially pure organo monosodium or dilithium products are desired, from the stoichiometric amount to an excess of say 10 times the stoichiometric amount of organo compound may be employed, based on a given molar proportion of metal. An excess of metal, twice the stoichiometric amount, may be present; however because of the relatively high cost of the metal compared to the organo compound, this is not generally practicable. In these reactions, catalytic quantities of the amine, e.g., from 0.05 to 0.5 mole of amine, per mole of metal may be used.

When organo-monolithium complexes are desired, the molar ratio of lithium to organo compound may be as defined above, but the molar ratio of lithium to amine may range from say 1:1 to 1:10.

When reaction I is considered, as such, conveniently equivalent amounts of the metal and the amine compound may be used. An excess of either reactant may be present without adverse effect; however because of the high cost of the metal, it is seldom used in excess. An overall range of proportions might extend from about 0.1 to about 50 mols of amine, per mol of metal.

Considering reaction II, as such, again proportions are not especially critical and from say 0.1 to about 50 moles of organo compound, per mole of N-alkali metal amine salt may be employed.

With respect to reaction III, as noted above, only catalytic quantities of amine need be employed. The proportions of acetylene may range from the equivalent amount, i.e. from about 0.5 to say about 5 moles per mole of lithium. Excess lithium can, of course, be present but is wasteful.

Reaction I may be conducted over a wide range of temperatures from say about 25° C. to about 225° C. In many cases it may conveniently be conducted at about the reflux temperature of the solvent, for it has been determined that the rate of reaction increases with temperature. Usually, no heating is required initially to insure reaction; moreover under some conditions it may be necessary to cool the reaction mixture to avoid loss of control of the reaction. In reaction II, the temperature of the reaction can range from about the freezing point of the solvent to about 45° C.

Reaction III and general reaction IV, being overall reactions, may be carried out over the entire range from the freezing point of the solvent used to the decomposition temperature of the complex and/or the cleavage temperature of the solvent. In many cases, since the reaction rate is a direct function of temperature, the reflux temperature of the solvent will be used where appropriate.

Ordinarily the ractions will be conducted at atmospheric pressure but sub or superatmospheric pressures say from about 1 mm. to about 20 atmospheres, absolute may be used if desired. It is desirable to exclude air from the reaction mixtures since the components of said mixtures are sensitive to air and thus the reactions are usually conducted under an atmosphere of inert gas such as nitrogen, argon and so forth. The usual procedure for carrying out the reaction will generally consist of adding the amine reactant to a suspension of the alkali metal in a solvent. The amine generally reacts with the alkali metal as rapidly as it is added and the reaction will be substantially complete when the addition of the amine is completed. If appropriate, the metal amine salt can be recovered. Since in most cases, however, the metal organo compound is the desired product, the organo reactant is introduced directly into the reaction mixture to form the desired product. To insure complete reaction between the organo compound and the N-alkali metal salt of the amine, the organo compound is maintained in the slurry over an extended period of time such as from ten minutes to ten hours or even up to several days. It is to be appreciated that while batch procedures may often be most useful when handling the reaction mixture, the process may also be carried out continuously.

To insure a satisfactory rate of reaction the reaction mixtures are subjected to conventional agitation, for example stirring and the like. In a single phase liquid system contact between the amine and the alkali metal is readily accomplished, whereas in a two-phase liquid system either longer reaction time or more vigorous contacting means must be employed to insure a satisfactory rate of contact between the reactants. When gaseous organo compounds are introduced into the mixture it has been noted that they are absorbed (reacted) directly upon contact with the reaction mixture.

After the reactions are complete, the desired product may be filtered, preferably under an atmosphere of inert gas. The resultant product may be isolated following known techniques. Conventional purification procedures can be employed such as recrystallization from a suitable solvent.

It will be understood that the reactions should be carried out in the absence of moisture or any other materials which are reactive with the reactants. Closed reaction vessels should be used and the free spaces thereof should contain only the vapors of the products of the reaction, the solvent and the inert gases discussed above.

The organolithium complexes of the invention can be used in various pharmaceutical and chemical processes, particularly specialty manufacturing operations where acetylene and liquid ammonia facilities which would normally be required but are undesirable because of expense and potential hazard. The complex monolithium acetylide ethylenediamine for example, can be used in ethynylation processes for producing vitamin A. In addition, monolithium acetylide·ethylenediamine (the acetylide) reacts actively with hindered and nonhindered ketones such as acetone and benzophenone. In addition, the various organolithium complexes of the invention can be used as coupling reagents with organic chlorides and bromides.

The process of the present invention will be more readily understood from a consideration of the following specific examples which are given for the purpose of illustration only and are not intended to limit the scope of the invention in any way.

The following example illustrates the preparation of a stable intermediate salt of lithium and an amine prepared according to reaction I described above. In all of the following examples the reactions are carried out in an inert atmosphere such as argon, nitrogen and the like.

Example I

To 3.12 moles of lithium dispersion in 625 ml. of heptane are added 3.28 moles of ethylenediamine over a period of one hour. The temperature quickly rises to reflux during the addition and is maintained at reflux for five additional hours. The slurry is filtered and dried. A 95% yield of N-lithioethylenediamine is recovered. The product analyzes 0.3% unreacted lithium metal.

The N-lithio type intermediate salts produced as described in Example I can be stored under an inert atmosphere for subsequent use. It is understood that lithiating agents other than lithium metal can be employed in the reaction with similar results, for example one mole of lithium nitride will lithiate three moles of the amine in a manner similar to that described above.

Examples II through VI illustrate the preparation of crystalline monolithium organo amine complexes in various ether solvents according to reaction II.

Example II

N-lithioethylenediamine (1.35 moles) in 350 ml. of 1,4-dioxane is treated with 1.50 moles of acetylene at 25° C., over a period of ten minutes. A 97% yield of crystalline monolithium acetylide·ethylenediamine (complex) is obtained.

Example III

N-lithioethylenediamine (0.35 mole) in 200 ml. of tetrahydrofuran is treated with 0.40 mole of acetylene at 25° C. over a period of two hours. A 93% yield of crystalline monolithium acetylide·ethylenediamine is obtained.

Example IV

N-lithioethylenediamine (0.27 mole) in 300 ml. of diethyl ether is treated with 0.30 mole of acetylene at 25° C. over a period of two hours. An 82% yield of crystalline monolithium acetylide·ethylenediamine is obtained.

Example V

N-lithioethylenediamine (0.48 mole) in 200 ml. of diethylcarbitol is treated with 0.55 mole of acetylene at 25° C. over a period of two hours. A 94% yield of crystalline monolithium acetylide·ethylenediamine is obtained.

Example VI

N-lithioethylenediamine (0.58 mole) in 400 ml. of 1,2-dimethoxyethane is treated with 0.65 mole of acetylene at 25° C. over a period of two hours. A 90% yield of crystalline monolithium acetylide·ethylenediamine is obtained.

For Examples II through VI above it is apparent that various oxygenated solvents can be used in conducting the novel reaction. Adverse side reactions such as cleavage of the solvent are avoided since the reaction is conducted at less than about 45° C. and generally at about 25° C. The monolithium acetylide·ethylenediamine crystalline product is stable at room temperature. It is understood that various alkali metal amine salts such as the alkali metal salts of N,N,N'-trimethylethylenediamine and N,N-diethylethylenediamine could be substituted for N-lithioethylenediamine in the foregoing examples.

The following example illustrates the preparation of an organolithium salt complex according to reaction II in the presence of an amine other than ethylenediamine.

Example VII

N-lithio-1,2-diamino propane is made from lithium and 1,2,diamino propane by the technique described in Example I. This compound, N-lithio-1,2-diaminopropane (0.24 mole), in 200 ml. of 1,4-dioxane is treated with 0.40 mole of acetylene at 25° C. over a period of two hours. The theoretical yield of monolithium acetylide·1,2-diaminopropane is obtained in slurry form.

The following Examples (VIII through XII) illustrate the preparation of an alkali metal organo complex of an amine according to reaction II wherein the solvent employed contains at least one nitrogen atom and has an acidic hydrogen atom which is no more acidic than the acid hydrogen atom of the amine compound used in forming the N-alkali metal intermediate.

Example VIII

N-lithioethylenediamine (0.61 mole) in 200 ml. of n-butylamine is treated with 0.70 mole of acetylene at 25°

C. over a period of two hours. A 75% yield of crystalline monolithium acetylide·ethylenediamine is obtained.

Example IX

N-lithioethylenediamine (0.35 mole) in 200 ml. of dibutylamine is treated with 0.40 mole of acetylene at 25° C. over a period of two hours. An 83% yield of crystalline monolithium acetylide·ethylenediamine is obtained.

Example X

N-lithioethylenediamine (.26 mole) in 200 ml. of tributylamine is treated with 0.30 mole of acetylene at 25° C. over a period of two hours. An 87% yield of crystalline monolithium acetylide·ethylenediamine is obtained.

Example XI

N-lithioethylenediamine (0.47 mole) in 200 ml. of pyridine is treated with 0.55 mole of acetylene at 25° C. over a period of two hours. An 80% yield of crystalline monolithium acetylide·ethylenediamine is obtained.

It is understood that other N-alkali metal intermediates could be used in Examples VIII through XI. For example, N-lithiodiethylenetriamine and N-lithio-1,2-diaminopropane could be used to produce similar results.

In the following example the amine compound has a three-fold function, serving as the basis for the formation of the intermediate compound, as a complexing agent, and also as the reaction solvent.

Example XII

N-lithioethylenediamine (0.60 mole) in 200 ml. of ethylenediamine is treated with 0.80 mole of acetylene at 25° C. over a period of two hours. An 87% yield of crystalline monolithium acetylide·ethylenediamine is obtained.

In the following Example (XIII through XV) various hydrocarbon solvents are employed to illustrate a further modification of reaction II.

Example XIII

N-lithioethylenediamine (1.05 moles) in 100 ml. of benzene is treated with 1.45 moles of acetylene at 25° C. over a period of two hours. A 96% yield of crystalline monolithium acetylide·ethylenediamine is obtained.

Example XIV

N-lithioethylenediamine (0.55 mole) in 200 ml. of xylene is treated with 0.65 mole of acetylene at 25° C. over a period of two hours. A 71% yield of crystalline monolithium acetylide·ethylenediamine is obtained.

Example XV

N-lithioethylenediamine (0.41 mole) in 200 ml. of hexane is treated with 0.55 mole of acetylene at 25° C. over a period of two hours. An 85% yield of crystalline monolithium acetylide·ethylenediamine is obtained.

It is noted that hydrocarbon solvents such as benzene, hexane and xylene can be employed in both steps of the reaction, that is in the formation of the intermediate N-alkali metal salt of the amine according to reaction I, and also in reaction II as illustrated in the above examples. In addition, such solvents can be employed as the dispersing media for the alkali metal salt dispersion. Therefore a one step process employing a single solvent such as benzene can be used to produce the organolithium salt complex of the invention.

In the following Examples XVI and XVII the essential role of an amine in effecting reaction between sodium and acetylene is brought out.

Example XVI

A sodium metal dispersion (1.00 mole) and hexane (245 ml.) are placed in a reaction flask. Acetylene (3.50 moles) is passed through the solution for seven hours. A temperature of 37° C. is maintained by gentle heating. No reaction occurs.

Example XVII

Ethylenediamine (0.0983 mole) is added to a suspension of sodium metal dispersion (0.983 mole) in 245 ml. of hexane. Acetylene (1.40 moles) is passed through the slurry for 2.75 hours. A temperature of 37° C. is maintained by gentle heating. The resulting white slurry is filtered and after drying contains 93% monosodium acetylide.

In the following example a reaction according to reaction II is conducted in the absence of a solvent to produce a monolithium·ethylenediamine complex.

Example XVIII

N-lithioethylenediamine (0.34 mole) is placed in a flask filled with an inert gas and without solvent. Acetylene is admitted at 0.5 p.s.i.g. after flushing out the inert gas. The flask is shaken occasionally by hand over a 3 day period. An 85% yield of monolithium acetylide·ethylenediamine is obtained.

The following example illustrates the preparation of a dilithium compound, i.e. dilithium acetylide according to reaction III wherein catalytic amounts of the amine are employed.

Example XIX

Ethylenediamine (0.647 mole) is added to a suspension of lithium metal dispersion (6.47 moles) in 1700 ml. of hexane in an argon atmosphere. Acetylene (8.00 moles) is passed through the slurry for four hours, the heat of reaction raises the slurry temperature to reflux (61° C.). After the reaction is complete, the resulting white slurry is filtered on sintered glass under a small argon pressure. An 84% yield of dilithium acetylide is obtained.

In Examples XX through XXV various organolithium diamine complexes are produced according to reaction II. In Examples XX and XXI for example, the organo compounds having a hydrogen atom more acidic than the amine compound are ethylacetylene and phenylacetylene respectively.

Example XX

N-lithioethylenediamine (0.56 mole) in 200 ml. of hexane is treated with 0.80 mole of ethylacetylene at 25° C. over a period of two hours. A 95% yield of crystalline lithium ethylacetylide·ethylenediamine is obtained.

Example XXI

N-lithioethylenediamine (0.12 mole) in 200 ml. of diethyl ether is treated with 0.13 mole of phenylacetylene at 25° C. After five hours a 98% yield of lithium phenylacetylide·ethylenediamine is obtained.

Example XXII

N-lithioethylenediamine (0.36 mole) in 250 ml. of diethyl ether is treated with 0.37 mole of fluorene. After six hours at 25–28° C., a 94% yield of 9-fluorenyllithium·ethylenediamine is obtained.

Example XXIII

N-lithioethylenediamine (0.37 mole) in 200 ml. of diethyl ether is treated with 0.38 mole of indene. After two hours at −10° C., an 85% yield of 1-indenyllithium·ethylenediamine is obtained.

Example XXIV

N-lithioethylenedamine (0.36 mole) in 200 ml. of diethyl ether is treated with 0.37 mole of aniline. After three hours at −10° C., a 99% yield of N-lithioaniline·ethylenediamine is obtained.

Example XXV

N-lithioethylenedamine (0.16 mole) in 100 ml. of diethyl ether is treated with 0.17 mole of diphenylamine. After two and one-half hours at −10° C., an 82% yield of crystalline N-lithiodiphenylamine·ethylenediamine is obtained.

From the foregoing examples (i.e. XX through XXV) it is apparent that various organo compounds having a hydrogen atom more acidic than the hydrogen atom of the amine compound can be used to form the corresponding organolithium amine complex according to reaction II. It is further evident this reaction can be effected at various temperatures and in various solvents. Various amine compounds in the class having the general formula $$NR_1R_2CH_2(CH_2)_xCHRNR_3R_4$$

can be substituted for ethylenediamine in the N-lithioethylenediamine salt and similar results will be obtained.

The following Examples (XXVI and XXVII) illustrate the formation of various organosodium compounds according to general reaction IV wherein the amine compound is employed in catalytic quantities.

*Example XXVI*

A dispersion is made from 0.22 mole of sodium in 50 ml. of Amsco 450 white, odorless mineral oil and 150 ml. of heptane. Ethylenediamine (0.015 mole) is added. Ethylacetylene (0.29 mole) is added at 35–40° C. for one hour. A 91% yield of sodium ethylacetylide is obtained.

*Example XXVII*

A dispersion is made from 0.22 mole of sodium in 50 ml. Amsco 450 white, odorless mineral oil and 150 ml. of heptane. Ethylenediamine (0.015 mole) and phenylacetylene (0.23 mole) were added. After five hours at 30–35° C. a 93% yield of sodium phenylacetylide is obtained.

In the following Examples (XXVIII and XXIX) various N-lithio amine compounds are used to produce monolithium acetylide complexes according to the reaction as set forth in reaction II.

*Example XXVIII*

N-lithio-1,3-diaminopropane is made from lithium and 1,3-diaminopropane by the technique described in Example I. This compound, N-lithio-1,3-diaminopropane (0.24 mole), in 200 ml. of 1,4-dioxane is treated with 0.40 mole of acetylene at 25° C. over a period of two hours. A 91% yield of monolithium acetylide·1,3-diaminopropane complex is obtained in slurry form.

*Example XXIX*

N,N'-dilithio-1,3-diaminopropane is made from lithium and 1,3-diaminopropane by the technique described in Example I. This compound, N,N'-dilithio-1,3-diaminopropane (0.21 mole), in 200 ml. of 1,4-dioxane is treated with 0.60 mole of acetylene at 25° C. over a period of two hours. A 75% yield of monolithium acetylide·1,3-diaminopropane complex is obtained in slurry form. Other di-substituted lithium amine salts such as N,N'-dilithioethylenediamine can be prepared and reacted in a similar manner.

The following example illustrates the preparation of monolithium acetylide complex wherein the amine compound used is N-substituted.

*Example XXX*

N-lithio diethylenetriamine is made from lithium and diethylenetriamine by the technique described in Example I. This compound, N-lithio diethylenetriamine (0.143 mole), in 200 ml. of dioxane is treated with 0.3 mole of acetylene at 25° C. over a period of about one hour. Theoretical yield of lithium acetylide·diethylenetriamine complex is obtained in crystalline form. It is understood that the N-alkali metal amine salts of other N-substituted amine compounds could be substituted for N-lithiodiethylenetriamine with similar results being obtained. For example, N,N,N'-trimethylethylenediamine, N-methyl-N'-butylethylenediamine and N-octyl-1,3-diaminopropane could be used.

While the invention has been described with reference to various particular preferred embodiments thereof, it will be appreciated that modifications and variations can be made without departing from the invention.

We claim:
1. A composition of matter having the general formula:

$$LiR' \cdot [NR_1R_2CH_2(CH_2)_xCHRNR_3R_4]$$

wherein $R_1$, $R_2$, $R_3$ and $R_4$ are each selected from the group consisting of hydrogen, alkyl radicals having from 1 to 10 carbon atoms and alkylamine radicals having from 1 to 10 carbon atoms, at least one of said $R_1$, $R_2$, $R_3$ and $R_4$ being hydrogen, R is selected from the group consisting of hydrogen and alkyl radicals having from 1 to 10 carbon atoms, wherein $x$ is a whole number from 0 to 1 wherein R' is derived from an organo compound selected from the group consisting of hydrocarbons and aromatic amines having an acidic hydrogen which is more acidic than the most acidic hydrogen atom of the amine compound.

2. A composition of matter according to claim 1 wherein R' is derived from an organo compound selected from the group consisting of acetylene, fluorene, indene, ethyl acetylene, phenyl acetylene, aniline and diphenylamine.

3. Lithium amine compounds selected from the group consisting of monolithium acetylide·1,2-diaminopropane, monolithium ethylacetylide-ethylenediamine, monolithium phenylacetylide·ethylenediamine, 1-indenyllithium·ethylenediamine, N-lithioaniline-ethylenediamine, N-lithiodiphenylamine·ethylenediamine, monolithium acetylide·1,3-diaminopropane, monolithium acetylide·diethylenetriamine, N,N'-dilithio-1,3-diaminopropane, N,N'-dilithioethylenediamine and 9-fluoroenyllithium·ethylenediamine.

4. Monolithium acetylide·ethylenediamine.

5. The process for producing stable organo alkali metal compounds which comprises the following reactions:

$$M + NR_1R_2CH_2(CH_2)_xCHRNR_3R_4 \rightarrow M[NR_2CH_2(CH_2)_xCHRNR_3R_4]$$

and $$M[NR_2CH_2(CH_2)_xCHRDR_3R_4] + R'H \rightarrow MR'(M)_z \cdot [NHR_2CH_2(CH_2)_xCHRNR_3R_4]_y$$

conducted at a temperature above the freezing point and below 225° C. but below the decomposition point of the materials involved, wherein M is an alkali metal, $x$, $y$ and $z$ are whole numbers from 0 to 1 with the sum of $x$, $y$ and $z$ being not greater than 2; $R_1$, $R_2$, $R_3$ and $R_4$ are each selected from the group consisting of hydrogen, alkyl radicals having from 1 to 10 carbon atoms and alkylamine radicals having from 1 to 10 carbon atoms, at least one of $R_1$, $R_2$, $R_3$ and $R_4$ being hydrogen and R is selected from the group consisting of hydrogen and alkyl radicals having from 1 to 10 carbon atoms, and R'H is an organo compound selected from the group consisting of hydrocarbons and aromatic amines having an acid hydrogen, H, which is more acid than the most acid hydrogen atom of said amine compound, provided that:

(a) when $y$ equals 1, the amine is reacted in equivalent amounts and $z$ equals 0;

(b) when $z$ equals 1, the amine compound is present in catalytic amounts and $y$ equals 0;

(c) when M is sodium, catalytic amounts of the amine compound are present and $y$ equals 0, and (d) 0.5 to 1 mole of organo compound R'H, are reacted per mole of alkali metal, M.

6. The process for producing alkali metal salts of amines which consists essentially in reacting in a liquid hydrocarbon and at a temperature between about 25 and about 225° C., an alkali metal reactant selected from the group consisting of lithium, sodium, lithium nitride, lithium hydride and sodium hydride with 0.5 to 1 mole, per atom of alkali metal in said alkali metal reactant, of an amine compound having at least one acid hydrogen atom and having the formula $NR_1R_2CH_2(CH_2)_xCHRNR_3R_4$ wherein $R_1$, $R_2$, $R_3$ and $R_4$ are each selected from the group consisting of hydrogen, alkyl radicals having from 1 to 10 carbon atoms and alkylamine radicals having from 1 to 10 carbon atoms, at least one of said $R_1$, $R_2$, $R_3$ and $R_4$ being hydrogen, $x$ is a whole number from 0 to 1 and R is selected from the group consisting of hydrogen and alkyl radicals having from 1 to 10 carbon atoms.

7. The process of claim 6 wherein said alkali metal reactant is a finely-divided lithium metal dispersion; wherein said liquid hydrocarbon is an aromatic hydrocarbon, and wherein said reaction is carried out at reflux.

8. A process for producing stable organo alkali metal compounds which consists essentially in reacting, at a temperature above the freezing point and below 225° C. but below the decomposition point of the materials involved, equivalent amounts of:
 (I) The reaction product of an alkali metal reactant selected from the group consisting of sodium, lithium, lithium nitride, sodium hydride and lithium hydride and an amine compound having at least one acidic hydrogen atom, said amine having the general formula $NR_1R_2CH_2(CH_2)_xCHRNR_3R_4$ wherein $R_1$, $R_2$, $R_3$ and $R_4$ are each selected from the group consisting of hydrogen, alkyl radicals having from 1 to 10 carbon atoms and alkylamine radicals having from 1 to 10 carbon atoms, at least one of said $R_1$, $R_2$, $R_3$ and $R_4$ being hydrogen, $x$ is a whole number from 0 to 1 and R is selected from the group consisting of hydrogen and alkyl radicals having from 1 to 10 carbon atoms, with
 (II) an organo compound selected from the group consisting of hydrocarbons and aromatic amines having a hydrogen atom that is more acidic than the most acidic hydrogen atom of the amine compound.

9. The process of producing stable organo alkali metal compounds which consists essentially in reacting an alkali metal reactant selected from the group consisting of lithium, sodium, lithium nitride, sodium hydride and lithium hydride with an organo compound in the presence of an amine compound having at least one acid hydrogen and having the formula $NR_1R_2CH_2(CH_2)_xCHRNR_3R_4$ wherein $R_1$, $R_2$, $R_3$ and $R_4$ are each selected from the group consisting of hydrogen, alkyl radicals having from 1 to 10 carbon atoms and alkylamine radicals having from 1 to 10 carbon atoms, at least one of said $R_1$, $R_2$, $R_3$ and $R_4$ being hydrogen, $x$ is a whole number from 0 to 1 and R is selected from the group consisting of hydrogen and alkyl radicals containing from 1 to 10 carbon atoms, said organo compound selected from the group consisting of hydrocarbons and aromatic amines having a hydrogen atom that is more acidic than the most acidic hydrogen atom of the amine compound, said organo compound being present in an amount between about 0.5 and about 10 moles thereof per atom of alkali metal, said amine compound being present in at least a catalytic amount, and the temperature of said reaction being above the freezing point and below 225° C. but below the decomposition point of the materials involved.

10. A process for producing stable organolithium compounds which consists essentially in:
 (1) reacting lithium with an amine compound having at least one acidic hydrogen atom and having the general formula $NR_1R_2CH_2(CH_2)_xCHRNR_3R_4$ wherein $R_1$, $R_2$, $R_3$ and $R_4$ are each selected from the group consisting of hydrogen, alkyl radicals having from 1 to 10 carbon atoms and alkylamine radicals having from 1 to 10 carbon atoms, at least one of said $R_1$, $R_2$, $R_3$ and $R_4$ being hydrogen, $x$ is a whole number from 0 to 1 and R is selected from the group consisting of hydrogen and alkyl radicals having from 1 to 10 carbon atoms to produce the corresponding intermediate N-lithio amine salt, the amount of amine reacted being 0.5 to 1 mole thereof per atom of lithium,
 (2) isolating said N-lithio amine salt, and
 (3) reacting equivalent amounts of said N-lithio amine salt and an organo compound selected from the group consisting of hydrocarbons and aromatic amines having a hydrogen atom that is more acidic than the most acidic hydrogen atom of the amine compound, said reactions being conducted at a temperature above the freezing point and below 225° C. but below the decomposition point of the materials involved.

11. A process for producing stable lithium acetylide·ethylene diamine which consists essentially in contacting, at a temperature from above the freezing point to about 45° C., lithium metal with acetylene in the presence of equivalent amounts of ethylenediamine, the acetylene being in an amount between about 0.5 and about 10 moles thereof per atom of lithium.

12. A method for producing dilithium acetylide which consists essentially in reacting, at a temperature above the freezing point and below 225° C. but below the decomposition point of the materials involved, lithium with acetylene in the presence of catalytic amounts of an amine compound having at least one acid hydrogen atom and having the general formula $$NR_1R_2CH_2(CH_2)_xCHRNR_3R_4$$

wherein $R_1$, $R_2$, $R_3$ and $R_4$ are each selected from the group consisting of hydrogen, alkyl radicals having from 1 to 10 carbon atoms and alkylamine radicals having from 1 to 10 carbon atoms, at least one of said $R_1$, $R_2$, $R_3$ and $R_4$ being hydrogen, $x$ is a whole number from 0 to 1 and R is selected from the group consisting of hydrogen and alkyl radicals having from 1 to 10 carbon atoms, said acetylene being in an amount between about 0.5 and about 5 moles thereof per atom of lithium.

References Cited by the Examiner

UNITED STATES PATENTS 2,200,941    5/1940    Vogt 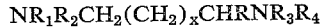 260—665

OTHER REFERENCES

Raphael: Acetylenic Compounds in Organic Synthesis, Academic Press Inc., New York (1955), p. 21.

CHARLES B. PARKER, *Primary Examiner.*